United States Patent
Taussig (10) Patent No.: US 6,590,607 B1
(45) Date of Patent: Jul. 8, 2003

(54) METHOD AND APPARATUS FOR STORING AN UNINTERRUPTED DIGITAL VIDEO STREAM

(75) Inventor: Carl P. Taussig, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/136,582

(22) Filed: Aug. 19, 1998

(51) Int. Cl.⁷ ............................................... H04N 5/228
(52) U.S. Cl. ................. 348/208.4; 348/14.13; 382/236; 375/240.02; 375/240.16
(58) Field of Search ...................... 382/236; 375/240.02, 375/240.26, 208.4, 240.16; 348/143, 14, 13, 394.1, 399.1, 402.1, 407.1, 413.1, 416.1

(56) References Cited

U.S. PATENT DOCUMENTS

| | | | |
|---|---|---|---|
| 4,959,725 A | | 9/1990 | Mandle ........................ 358/222 |
| 4,980,761 A | * | 12/1990 | Natori ...................... 348/14.08 |
| 5,235,427 A | * | 8/1993 | Kim ........................ 348/208.16 |
| 5,467,138 A | * | 11/1995 | Gove ........................... 348/452 |
| 5,596,565 A | | 1/1997 | Yonemitsu et al. ....... 369/275.3 |
| 5,684,538 A | | 11/1997 | Nakaya et al. .............. 348/416 |
| 5,737,481 A | * | 4/1998 | Gushima et al. ............. 386/113 |
| 5,757,968 A | | 5/1998 | Ando .......................... 382/236 |
| 5,764,803 A | | 6/1998 | Jacquin et al. .............. 382/236 |
| 5,764,921 A | | 6/1998 | Banham et al. ......... 395/200.77 |
| 5,915,069 A | * | 6/1999 | Nishijima .................... 348/143 |
| 5,926,209 A | * | 7/1999 | Glatt ........................... 348/143 |
| 6,065,094 A | * | 5/2000 | Akiyama ..................... 711/112 |
| 6,169,574 B1 | * | 1/2001 | Noguchi et al. ............. 348/208 |
| 6,292,215 B1 | * | 9/2001 | Vincent ....................... 348/169 |
| 2001/0000969 A1 | * | 5/2001 | Ohta et al. ................... 348/231 |

FOREIGN PATENT DOCUMENTS

| | | | | |
|---|---|---|---|---|
| EP | 0823816 A2 | 2/1998 | ............ | H04N/5/77 |
| JP | 08307811 | 11/1996 | | |

* cited by examiner

Primary Examiner—Wendy R. Garber
Assistant Examiner—John M. Villecco (57) ABSTRACT

A method and apparatus for storing an uninterrupted digital video stream using a motion-sensitive memory system involve monitoring the acceleration experienced by the memory system and adjusting the compression of the digital video stream when the acceleration of the memory system requires that data writing be temporarily suspended. Uninterrupted digital video streams are captured and stored with a handheld digital video camera that records compressed digital video data with an on-camera optical memory system that utilizes an optical disk, such as an 8 centimeter digital video disk (DVD). Compressed digital video data is written to the optical disk by a write head that has an acceleration threshold beyond which data writing is suspended because the acceleration causes data writing to be unreliable. When the acceleration threshold is exceeded, the compression of the digital video data is increased, so that the writing of data onto the optical disk has access to the total volume of generated digital video data when the writing operation resumes.

19 Claims, 5 Drawing Sheets

METHOD AND APPARATUS FOR STORING AN UNINTERRUPTED DIGITAL VIDEO STREAM

TECHNICAL FIELD

The invention relates generally to the storing of digital video streams and more particularly to the storing of uninterrupted digital video streams using a motion-sensitive memory system, such as an optical memory system.

BACKGROUND ART

Present electronic devices allow for the recording of video data in a digital format. A common format for recording digital video data is defined by the Motion Picture Expert Group (MPEG) and is known as the MPEG format. Because digital video data is extremely voluminous, the MPEG format allows captured digital video data to be compressed before it is stored. Digital video data is stored on a variety of media, including magnetic tapes, magnetic disks, and optical disks. In the optical storage field, digital video data is commonly stored on read only memory (ROM) disks, such as digital video disks (DVDs).

Current advances in the optical storage field include optical memory systems that allow writing and/or rewriting of data onto optical disks. In writing data to an optical disk, a write head directs a beam of laser light into narrow recording tracks on the optical disk. Unwanted motion of the write head during writing can cause the laser beam to improperly contact the desired recording track, thereby degrading the quality of the recorded data. Because of the motion sensitivity of optical writing systems, optical writing systems are typically employed only in stable devices, such as desktop computers.

As previously noted, video images captured in digital video format require a large volume of storage memory. Because of the large storage capacity of optical storage systems, it is desirable to optically record or write digital video data onto an optical disk. For example, a handheld video camera equipped with an optical memory system that writes data onto an optical disk provides the ability to capture a large volume of video data without having to repeatedly exchange the storage media.

Figure 1:
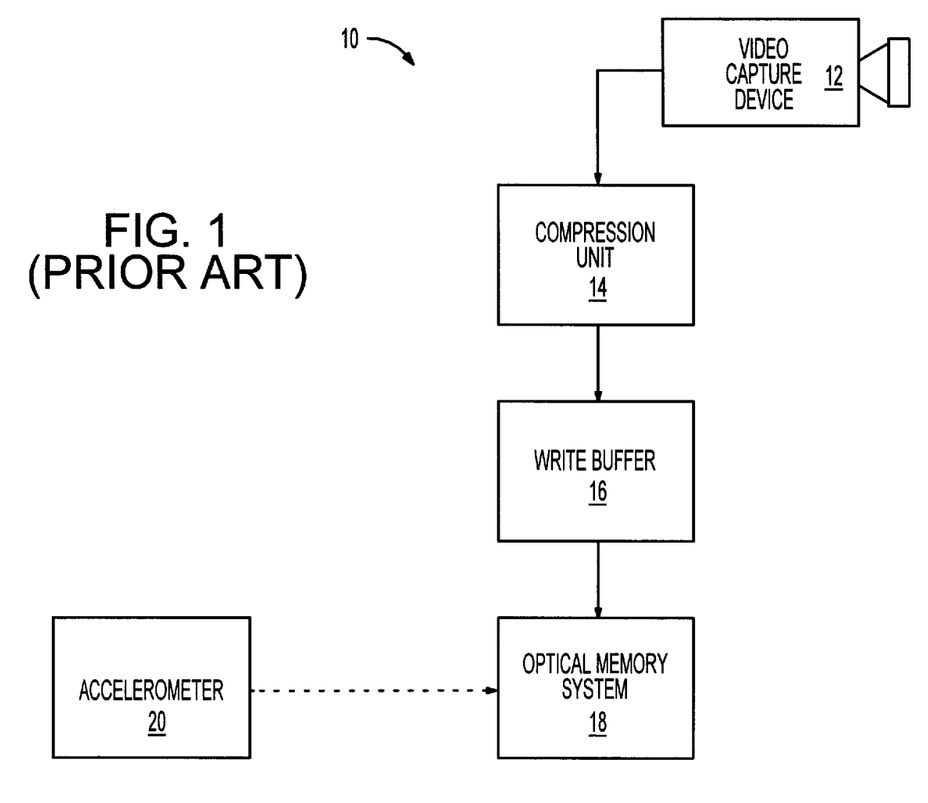
FIG. 1 is a depiction of the components of a handheld digital video system that records digital video data onto an optical memory disk in accordance with the prior art.

One problem with writing digital video data to an optical disk incorporated into a handheld video camera is that optical memory systems are motion-sensitive and a handheld camera is susceptible to motion caused by the user or the environment of the user (i.e., recording digital video data while traveling in a moving car). FIG. 1 is a depiction of the components of a handheld digital video camera system 10 that records digital video data onto an optical memory disk. The digital video capture device 12 is a conventional video camera that combines optical lenses and a charge coupled device (CCD) array to electronically capture image data in a digital format. Digital video data that is captured in the digital video capture device is forwarded to a compression unit 14 that compresses the digital video data using conventional compression techniques. The compressed digital video data is forwarded to a write buffer 16 that buffers the compressed digital video data in order to smooth out the delivery of the compressed video data to an optical memory system 18.

The write buffer 16 is typically made up of a fixed amount of RAM memory that is incorporated into the video camera circuitry. The conventional optical memory system includes a write head and an optical disk spindle. The write head includes a laser source that is used to optically write digital video data to the narrow tracks of an optical disk that is located on the optical disk spindle. As stated above, the writing process is a very motion sensitive and precise operation. If mechanical disturbances beyond a certain threshold are encountered by an optical memory system during data writing, it is likely that the data writing will be adversely affected. For example, when data writing is continued during a mechanical disturbance, video data recorded on adjacent tracks of the disk may be destroyed or rendered unreadable. In order to minimize the problems involved with writing to an optical memory system, it is desirable to momentarily stop recording when unacceptable mechanical disturbances, measured as motion or acceleration, are detected by an acceleration detection device, such as an accelerometer 20.

While momentarily stopping writing to an optical disk during periods of mechanical disturbances avoids recording inaccurate digital video data and/or destroying data on adjacent tracks, possibly rendering the disk unreadable, a different problem may be created if data writing is suspended for too long a period of time. The problem involves overflowing the write buffer 16 that is located between the compression unit 14 and the optical memory system 18. Assuming a continuous stream of digital video data is being generated by the video capture device 12 during the time that writing to the optical memory system is suspended, the write buffer is accumulating the digital video data that cannot be written to the optical memory system. If the write buffer reaches its storage capacity, instead of having unreliable data recorded because of mechanical disturbances, complete portions of digital video data will be lost as the write buffer begins to drop data for which it has no storage capacity.

Prior art solutions to the problem of writing data in spite of mechanical disturbances include increasing the size of the write buffer 16 and/or increasing the write head tracking bandwidth of the optical memory system 18. For example, the write buffer can be made sufficiently large such that digital video data captured during a mechanical disturbance is absorbed into the large write buffer until the optical memory system can resume recording. While increasing the capacity of the write buffer may work well, it may not be cost-effective to simply add RAM to the write buffer. Regarding increasing the write head tracking bandwidth of the optical memory system for the purpose of solving the writing problem, additional mechanical stabilization would likely have to be added to the memory system along with feed forward control of the write head actuator based on input from the accelerometer to stabilize the write head and the optical disk. Again, this adds to the expense of the video system and may not be cost-effective.

In view of the stated shortcomings of the techniques used to overcome the problems involved with storing digital video data with motion-sensitive memory systems, what is needed is a method and apparatus that can store uninterrupted streams of compressed digital video data even when mechanical disturbances cause data writing to be temporarily interrupted.

It is important to note that there is a large volume of prior art that deals with increasing the capture rate for recording video data that includes images in a first pace motion, such as a horse running in front of a fixed landscape, and that deals with minimizing the shake that is perceived in a video stream that is recorded with an unsteady camera. Although prior art concerning these two concerns may seem related to the present disclosure, this prior art is only concerned with how video data is captured and compressed, rather than how the video data is transferred to a long-term storage medium, such as an optical disk.

SUMMARY OF THE INVENTION

A method and apparatus for storing an uninterrupted digital video stream with a motion-sensitive memory system involve monitoring the acceleration experienced by the memory system and adjusting the compression of the digital video stream in response to the acceleration. In the preferred embodiment, a threshold-related condition is established such that detection of the condition simultaneously triggers a suspension of data writing and an increase in a data compression ratio. As long as an acceleration threshold is not exceeded, the compressed digital video data is written to an optical disk by an optical memory system. However, when an occurrence, such as a mechanical disturbance, causes the acceleration threshold to be exceeded, data writing is suspended, because the acceleration jeopardizes the reliability of the data writing. When acceleration causes data writing to be suspended, the compression of the digital video data is increased so that the digital video is not lost while it continues to be captured by a video capture device.

In the preferred embodiment of the invention, the uninterrupted digital video streams are captured and stored with a handheld digital video camera that records compressed digital video data with an on-camera optical memory system that utilizes an optical disk, such as an 8 cm digital video disk (DVD). The components of the digital video system include a video capture device, a compression unit, a write buffer, an optical memory system, an acceleration detection unit, and a compression controller. The video capture device utilizes optical lenses to focus light from objects of interest onto an array of charged coupled device (CCD) sensors. The CCD array outputs digital data that is formatted into digital video data according to the MPEG II standard and the quality of the digital video data corresponds to the resolution of the CCD array and the speed with which video data is extracted from the CCD array.

The compression unit receives digital video data from the video capture device and compresses the digital video data to maximize the amount of data that can be stored by the associated optical memory system. The compression unit compresses digital video data at a particular compression ratio, where the compression ratio is defined as the volume of compressed data that is generated from a given volume of uncompressed data.

The write buffer is memory that temporarily stores compressed digital video data in order to average the transfer rate of the data that is forwarded to the optical memory system. The write buffer includes RAM memory that is sufficiently large to store digital video data that accumulates during temporary interruptions of data writing to the optical memory system.

The optical memory system includes a write head and an optical disk, where the write head utilizes a laser source that generates a narrow beam of laser light to write digital data into tracks of the optical disk. In order to accurately generate the physical changes in an optical disk at the required data density, the laser beam must be directed onto the optical disk with extreme accuracy. If mechanical disturbances create acceleration of the optical memory system beyond the established acceleration threshold, data writing must be temporarily suspended until acceleration is within the acceptable parameters. Data writing must be temporarily suspended because the writing of the data to the optical disk becomes unreliable as a result of unpredictable motion between the write head and the optical disk.

The acceleration detection unit is used to detect acceleration of the digital video system, and specifically of the optical memory system. The acceleration detection unit may include an accelerometer that directly senses acceleration of the optical memory system. Alternatively, the acceleration detection unit may include specialized circuitry that analyzes captured video frame data to calculate acceleration of the optical memory system.

The interaction of the compression controller, the acceleration detection unit, and the compression unit is the focus of the invention. The compression controller includes logic that is operatively connected between the acceleration detection unit and the compression unit. The function of the compression controller is to indicate to the compression unit that the digital video compression ratio should be adjusted to account for time periods when writing to the optical memory system has been suspended because of occurrences, such as mechanical disturbances, that impose conditions in which the acceleration threshold is exceeded. In order to influence the compression unit, the compression controller receives input data from the acceleration detection unit concerning any accelerations that the optical memory system is being subjected to. If the optical memory system is being subjected to accelerations greater than the pre-established acceleration threshold, the compression controller calculates the adjustments in the compression ratio that are necessary to compensate for the time that writing by the optical memory system is suspended. The goal of the adjusted compression ratio is to ensure that the write buffer does not overflow with digital video data that is streaming from the video capture device while writing to the optical memory system is suspended. If the write buffer were allowed to overflow with streaming digital video data, video data would be permanently lost and viewed video images may look choppy and/or incomplete.

The compression controller unit includes logic that allows the compression controller to respond differently to periodic mechanical disturbances than to random mechanical disturbances. For example, based on information from the acceleration detection unit, the compression controller can identify when periodic mechanical disturbances are occurring and subsequently adjust the compression ratio of the compression unit in advance of succeeding periodic mechanical disturbances. If the disturbances cease to occur in a periodic fashion, then the compression controller can indicate to the compression unit to return to a standard compression ratio. In contrast, the compression controller can, in conjunction with the acceleration detection unit, identify when a random mechanical disturbance has occurred that requires the compression ratio of the compression unit to be adjusted. Since there is no way of predicting when a random mechanical disturbance will occur or how long the random disturbance will last, the compression ratio is adjusted over a time interval that is subsequent to at least the start of the mechanical disturbance.

In an enhanced version of the digital video system, the compression controller receives storage level information from the write buffer, and this information is used in addition to the acceleration detection unit information to adjust the compression ratio of the compression unit. That is, if the write buffer indicates to the compression controller that the write buffer is near its storage capacity, then the compression controller can increase the compression ratio achieved by the compression unit in order to reduce the incoming flow of write compressed digital video data to the write buffer and therefore preserve the uninterrupted digital video stream.

An advantage of the invention is that uninterrupted digital video streams can be recorded even when data writing is temporarily suspended without requiring expensive modifications to a digital video system, such as adding large amounts of RAM or increasing mechanical stability.

DETAILED DESCRIPTION

Figure 2:
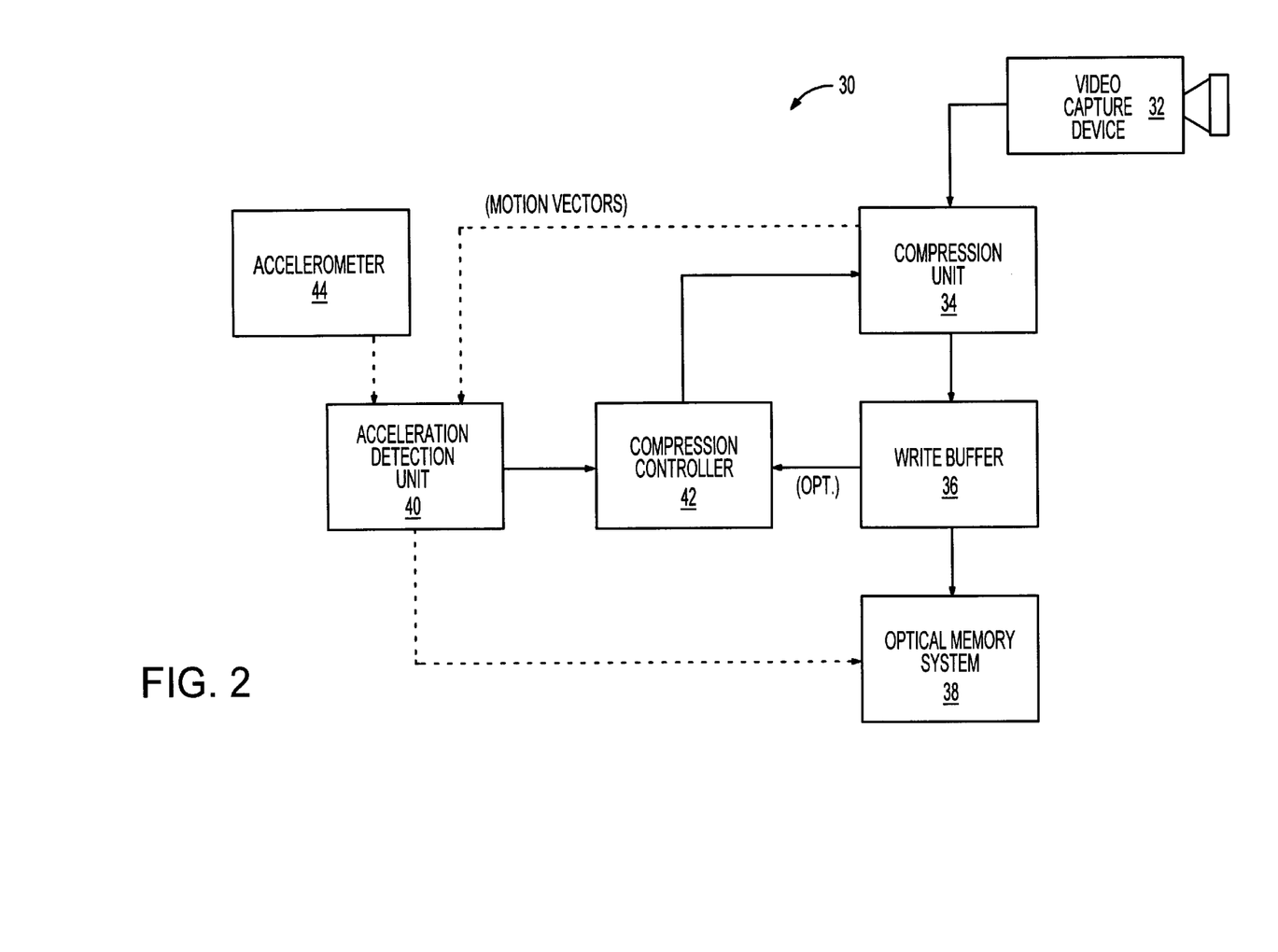
FIG. 2 is a depiction of the components of a handheld digital video system that records digital video data onto an optical memory disk in accordance with the invention.

FIG. 2 is a depiction of the components of a digital video system 30 that stores uninterrupted digital video streams in accordance with the invention. As with the prior art system of FIG. 1, the digital video system includes a video capture device 32, a compression unit 34, a write buffer 36, an optical memory system 38, and an acceleration detection unit 40. In addition, the digital video system of the invention includes a compression controller 42 that operates to control the compression ratio of the compression unit, as will be described in further detail below. Preferably, the digital video system is a portable handheld video camera that can be operated by a single user to record video streams. The components of the digital video system are described first, followed by a description of the operation of the system.

The video capture device 32 utilizes optical lenses to focus light from objects of interest onto an array of sensors. The array of sensors is preferably a CCD array with a resolution that corresponds to the number and size of pixels in the array. The CCD array outputs video data that is formatted into digital video data according to the MPEG standard, although formatting according to the MPEG standard is not critical to the invention. The quality of the digital video data corresponds to the resolution of the CCD array and the speed with which video data is extracted from the CCD array, for example, how many frames of video data are captured per second.

The compression unit 34 receives the digital video data from the video capture device 32 and compresses the digital video data to maximize the amount of data that can be stored by the associated storage system. Preferably, the compression unit compresses the video data according to MPEG standards, although other formats are possible. The compression unit is formed with conventional circuitry and may include buffer memory which allows the temporary storage of video strings that are awaiting compression. The compression unit compresses digital video data at a particular compression ratio, where the compression ratio is defined as the volume of compressed data that is generated from a given volume of uncompressed data. The compression unit may also include decompression circuitry that allows stored digital video data to be decompressed for viewing on, for instance, an on-camera display (not shown).

The write buffer 36 is memory that temporarily stores compressed digital video data before the data is forwarded to the optical memory system 38. Preferably, the write buffer includes RAM memory that can store enough compressed digital video data to provide a steady stream of video data to the optical memory system during write operations. In an enhanced embodiment of the invention, the write buffer is able to generate a real-time indication of available storage capacity in the write buffer. Use of the storage capacity indicator is described in detail below.

The optical memory system 38 is a system that is able to optically write data to a storage medium. The optical memory system includes a write head and an optical disk. The write head includes a laser that generates a narrow beam of laser light. The narrow beam of laser light is projected onto precise tracks of the optical disk in order to cause physical changes in the tracks of the optical disk that represent the digital data. In order to precisely form the physical changes in an optical disk at the required density, the laser beam must be directed onto the optical disk with extreme accuracy. A combination of movements of the write head and the optical disk are used to position the laser beam in the proper position to write data onto the disk. If mechanical disturbances create acceleration of the optical memory system 38 beyond acceleration thresholds, or tolerances, that are pre-established by, for example, the manufacturer, data writing can be temporarily suspended until acceleration is within the acceptable thresholds. Acceleration thresholds are typically set with a margin of error that ensures the reliability of data writing as long as the system is within the thresholds. Preferably, the optical memory system utilizes standard 8 cm or 12 cm optical disks, although other sizes and other types of optical disks are possible. Additionally, although an optical memory system is described in the preferred embodiment, other motion-sensitive memory systems may be substituted as the memory system. For example, as will become apparent to one of ordinary skill in the art, magnetic disk drives that require precise location of magnetic write heads may also be adapted to utilize the invention.

The acceleration detection unit 40 is used to detect acceleration, or motion, of the digital video system 30 and specifically the optical memory system 38. The acceleration detection unit may include an accelerometer 44 that directly senses acceleration of the video system or the acceleration detection unit may include specialized circuitry that analyzes captured video frame data to calculate acceleration of the video system. To calculate acceleration, motion vectors are forwarded from the compression unit 34 or the video capture device 32 to the acceleration detection unit, where the motion vectors are converted into acceleration information. Motion vectors can be determined with conventional techniques that utilize differential changes in pixel values over small time increments to determine motion direction and rate. It should be noted that camera motion shows up as common mode motion of all of the pixels between frames, whereas the motion of subjects within frames appears as relative motion between pixels. In either case, the acceleration detection unit is operationally associated with the optical memory system and the compression controller 42. With regard to the optical memory system, the acceleration detection unit indicates to the optical memory system the level of acceleration that is being experienced by the optical memory system. If the level of acceleration exceeds established acceleration thresholds, then the optical memory system can suspend data writing operations. Although two acceleration detection techniques are described, other techniques may be implemented in accordance with the invention.

The compression controller 42 includes logic that is operatively connected between the acceleration detection unit 40 and the compression unit 34. The function of the compression controller is to indicate to the compression unit that the digital video compression ratio should be adjusted to account for time periods when writing to the optical memory system 38 has been suspended because of mechanical disturbances. In order to influence the compression unit, the compression controller receives input data from the acceleration detection unit concerning any accelerations that the optical memory system is being subjected to. If the optical memory system is subjected to accelerations greater than a pre-established threshold, the compression controller calculates the adjustments in compression ratio that are necessary to compensate for the time that writing by the optical memory system is suspended.

The compression controller 42 includes logic that allows the compression controller to respond differently to periodic mechanical disturbances, as compared to random mechanical disturbances. For example, based on information from the acceleration detection unit 40, the compression controller can identify when periodic mechanical disturbances are occurring and can adjust the compression ratio of the compression unit in advance of succeeding periodic mechanical disturbances. If the disturbances cease to occur in a periodic fashion, then the compression controller can indicate to the compression unit 34 to return to a standard compression ratio. In contrast, the compression controller can, in conjunction with the acceleration detection unit, identify when a random mechanical disturbance has occurred that requires the compression ratio of the compression unit to be adjusted because the writing operations have been suspended. Since there is no way of predicting when a random mechanical disturbance will occur or how long the random disturbance will last, the compression ratio is adjusted over a time interval that is subsequent to at least the start of the mechanical disturbance. Operation of the digital video system 30 is described in detail below in relation to periodic mechanical disturbances and in relation to random mechanical disturbances.

In an enhancement of the operation of the compression controller 42, the compression controller receives write buffer storage level information that is used in addition to the acceleration detection unit information to adjust the compression ratio of the compression unit 34. That is, if the write buffer indicates to the compression controller that the buffer is near its storage capacity, then the compression controller can increase the compression ratio achieved by the compression unit in order to reduce the rate of flow of compressed digital video data to the write buffer 36.

Figure 3:
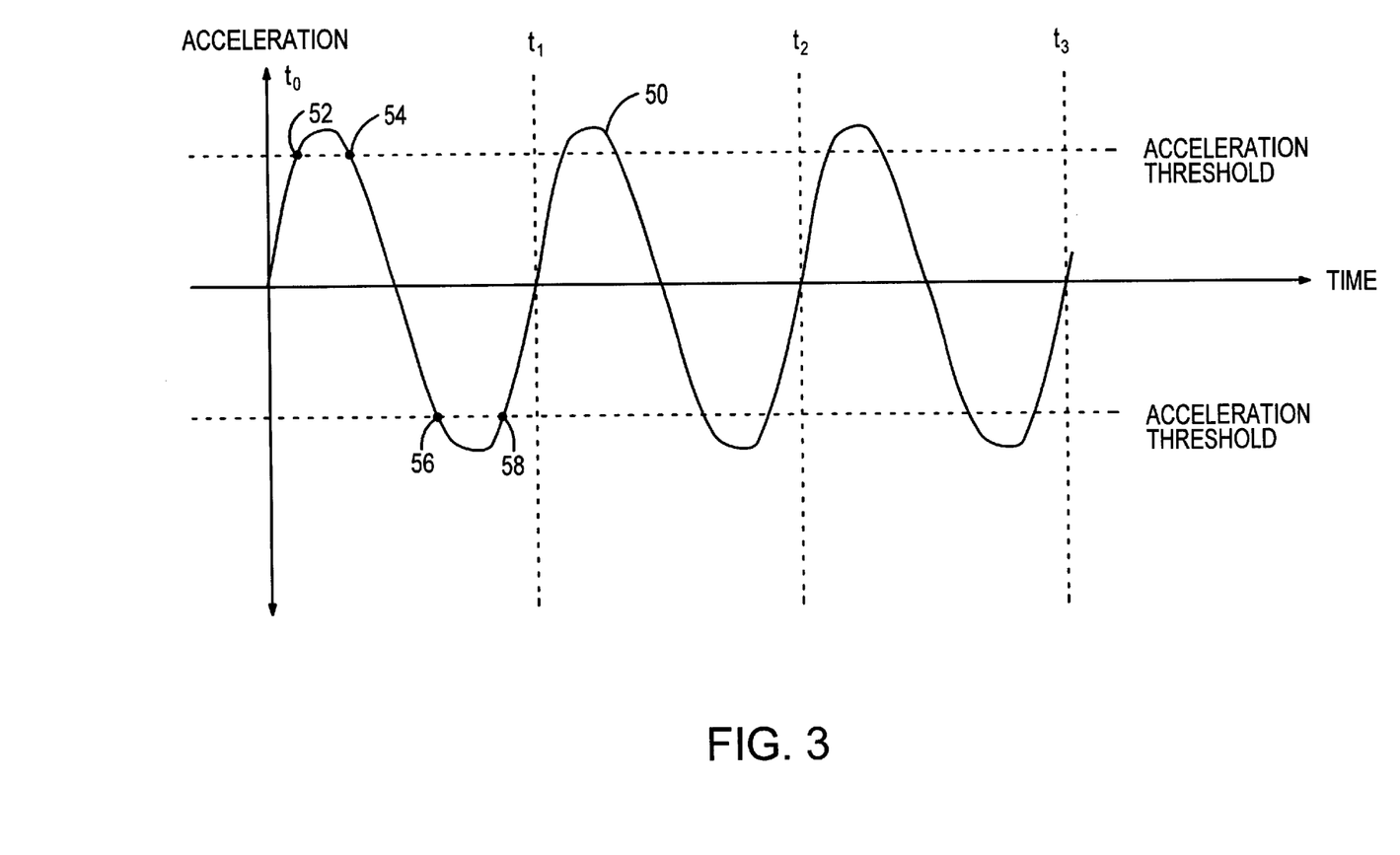
FIG. 3 is a graph of the acceleration of the handheld digital video system of FIG. 2 where the acceleration occurs in a periodic pattern.

Operation of the system in relation to periodic mechanical disturbances is described with reference to FIG. 3. FIG. 3 is a graph of the acceleration of the digital video system 30, and more specifically the optical memory system 38, in two directions versus time in the situation where the acceleration is encountered in a periodic pattern. In the graph, time intervals are identified by vertical dashed lines at each complete period of the periodic acceleration curve 50. The acceleration thresholds in the two directions of acceleration are identified by the horizontal dashed acceleration threshold lines, where the acceleration thresholds identify the rate of acceleration that requires the suspension of data writing by the optical memory system 38. Once the rate of acceleration of the digital video system 30, as identified by the acceleration curve, exceeds an acceleration threshold, writing to an optical disk by the optical memory system is suspended for the entire period of time that the acceleration tolerance is exceeded.

Referring back to FIG. 2, to begin storing uninterrupted digital video streams, digital video data is captured into a digital electronic format through the video capture device 32. Simultaneously with the capture of the digital video data, the acceleration detection unit 40 is monitoring the acceleration of the digital video system to determine if the pre-established acceleration thresholds have been exceeded. If the acceleration thresholds are not exceeded, then no modification of the compression ratio used by the compression unit 34 is necessary. If, on the other hand, as depicted in the graph of FIG. 3, the acceleration thresholds are exceeded, the compression ratio is adjusted appropriately. While in operation, the compression controller 42 constantly monitors the acceleration of the digital video system to determine if mechanical disturbances are occurring on a periodic basis. For example in FIG. 3, after two cycles of periodic disturbances are detected, the compression controller identifies the periodic nature of the disturbances and adjusts the compression ratio of the compression unit to compensate for the time intervals during which writing by the optical memory system 38 is suspended.

Once periodic mechanical disturbances have been identified, the compression controller 42 determines how the compression of the digital video data must be altered to account for the time periods when data writing is suspended. For example, in the first time interval beginning at $t_0$ and ending at $t_1$, data writing is suspended in the time interval from point 52 to point 54 and in the time interval from point 56 to point 58, leaving the remaining time for data writing. As a result, the compression controller will direct the compression unit to increase the compression ratio of the digital video data, so that the data writing can keep pace with the rate of digital video capture even though the data writing must occur in a period of time that is shorter than the period of time utilized for digital video capture. The compression ratio is increased so that when the compressed digital video data is sent to the write buffer 36, the write buffer does not reach capacity before the optical memory system 38 resumes writing. In an enhanced version of the digital video system 30, the write buffer indicates its storage level to the compression controller in real-time, so that the compression controller can adjust the compression ratio not only in response to the mechanical disturbances but in response to the current storage level of the write buffer.

To complete the storage of uninterrupted digital video streams, the digital video that has been compressed to compensate for mechanical disturbances is forwarded to the write buffer 36 for temporary storage before being forwarded to the optical memory system 38. During the time intervals when the acceleration tolerances are within the acceptable limits, the optical memory system receives compressed digital video data from the write buffer and writes the data to an optical disk, thereby recording uninterrupted digital video streams even though data writing was temporarily suspended.

Figure 4:
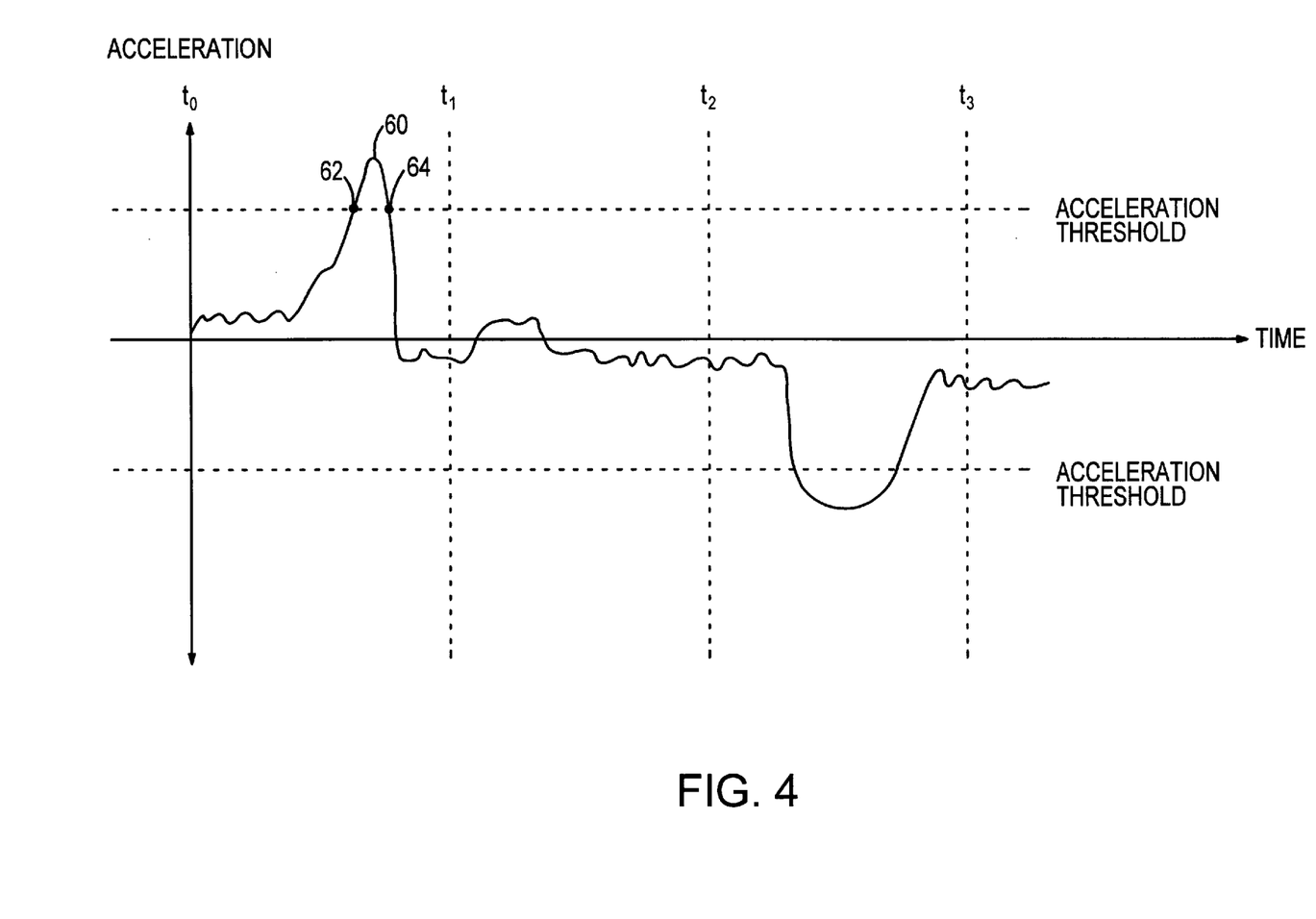
FIG. 4 is a graph of the acceleration of the handheld digital video system of FIG. 2 where the acceleration randomly occurs.

Operation of the system in relation to random mechanical disturbances is described with reference to FIG. 4. FIG. 4 is a graph of acceleration of the digital video system 30, and specifically the optical memory system 38, in two directions versus time in a situation where the acceleration curve 60 is distributed in a random manner. In the graph, arbitrary time intervals are identified with vertical dashed lines and the acceleration thresholds in the two directions of acceleration are identified by the horizontal dashed acceleration threshold lines, where the acceleration thresholds identify the rate of acceleration that requires the suspension of data writing by the optical memory system.

Referring back to FIG. 2, to begin storing uninterrupted digital video streams in the case of random mechanical disturbances, digital video data is captured into a digital electronic format through the video capture device 32. Simultaneous with the capture of the digital video data, the acceleration detection unit 40 is monitoring acceleration of the digital video system 30 to determine if the preestablished acceleration thresholds have been exceeded. If the acceleration thresholds are not exceeded, no modification of the compression ratio used by the compression unit 34 is necessary. If, on the other hand, as depicted in the graph of FIG. 4 the acceleration thresholds are exceeded, the compression ratio is adjusted appropriately. For example, in a first time interval beginning at $t_0$ and ending at $t_1$, the acceleration threshold is exceeded during the time interval starting at point 62 and ending at point 64 and as a result data writing by the optical memory system 38 is suspended for the identified time period.

In order to properly adjust the compression ratio of the digital video data, the compression controller 42 sets arbitrary time intervals and then measures the amount of time during a time interval that the acceleration thresholds are exceeded and writing is suspended. The compression controller then determines the adjustment in the compression ratio that is required in order to ensure that the write buffer 36 does not overflow and lose portions of the digital data. The adjusted compression ratio is implemented at the beginning of the second time interval and continued as long as necessary to maintain a steady state, or nearly steady state, of compressed digital video data flowing into and out of the write buffer.

The acceleration curve 60 in the second time interval of FIG. 4 beginning at $t_1$ and ending at $t_2$ shows that the acceleration threshold is not exceeded and as a result, at the end of the second time interval the compression ratio is adjusted accordingly. For example, the compression ratio is lower for the second time interval than the compression ratio that was required to account for the mechanical disturbance encountered in the first time interval. The compression ratio determined for the second time interval is implemented during the third time interval.

As can be seen, during the third time interval another random mechanical disturbance occurs where the disturbance exceeds the acceleration threshold for a period of time greater than the first disturbance. Again, in order to prevent the write buffer from overflowing, the compression ratio that is implemented in the fourth time interval (not shown) is higher than either of the two previous compression ratios in order to maintain the write buffer near a steady state. In an enhanced version of the invention, the write buffer indicates to the compression controller 42 the current level of data storage, SO that the compression controller can take the storage level information into account when adjusting the compression ratio for the subsequent time interval.

To complete the storage of an uninterrupted digital video stream, the compression unit 34 compresses the digital video data received from the video capture device 32 as directed by the compression controller 42. The compressed digital video data is then forwarded to the write buffer 36, where it is stored until it is written onto an optical disk by the optical memory system 38. The optical memory system writes the compressed digital video data to an optical disk whenever the acceleration thresholds are not exceeded, thereby recording uninterrupted digital video streams even though data writing was temporarily suspended.

Figure 5:
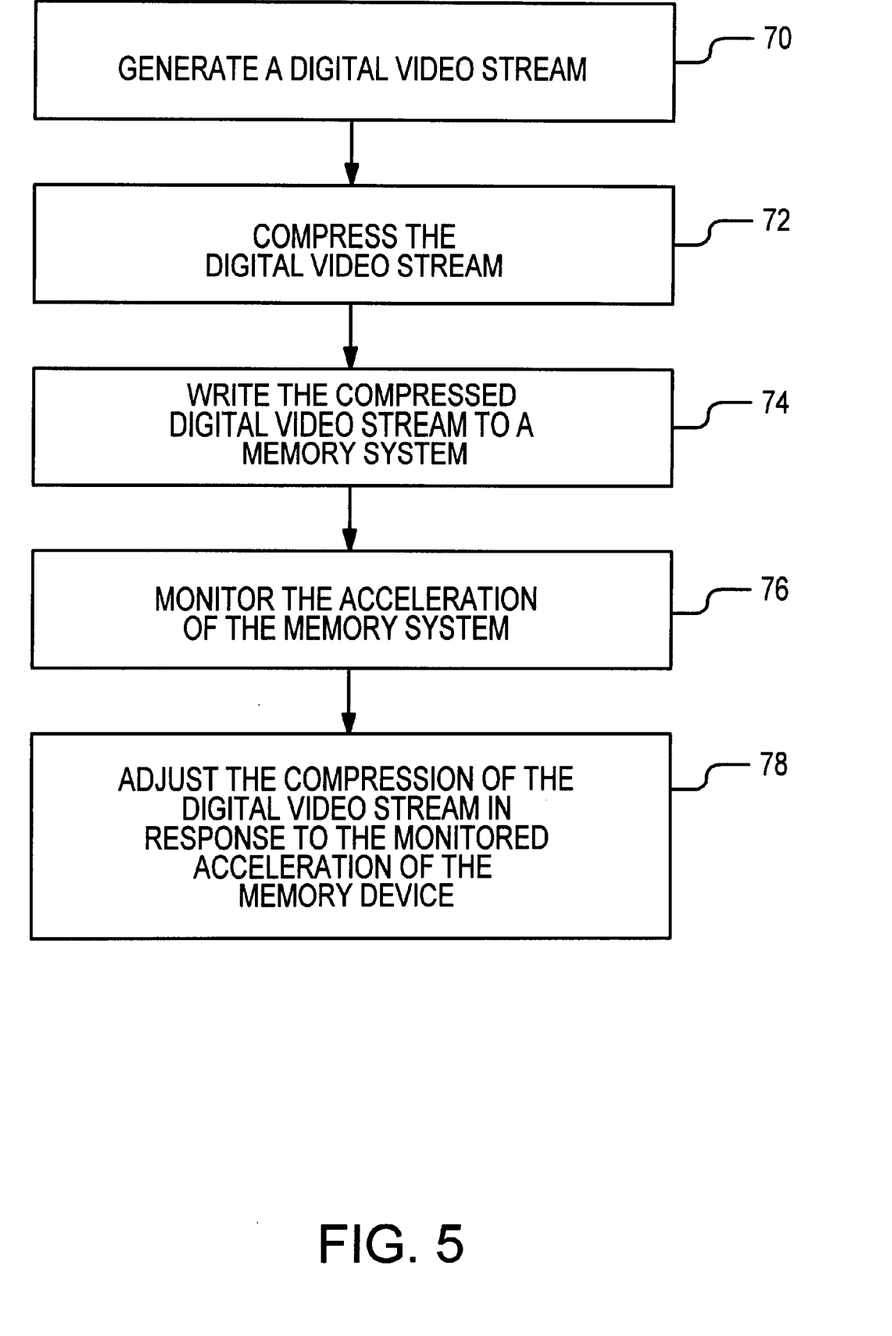
FIG. 5 is a process flow diagram for storing an interrupted digital video stream in accordance with the invention.

The steps involved in storing uninterrupted digital video streams are summarized in the process flow diagram of FIG. 5. In a step 70, a digital video stream is generated with a digital video capture device. In a step 72, the digital video stream is compressed at a first compression ratio. In a step 74, the compressed digital video stream is written to a memory system that is connected to the video capture device, wherein the memory system and the digital video capture device are movable relative to their surrounding environment. In a step 76, acceleration of the memory system is monitored. In a step 78, the compression of the digital video stream is adjusted to a new compression ratio in response to the monitored acceleration of the memory system.

What is claimed is:

1. A method for storing uninterrupted digital video streams comprising the steps of:

generating a digital video stream with a digital video capture device;

compressing said digital video stream at a first compression ratio;

directing said compressed digital video stream to a memory system for writing said compressed digital video stream, said memory system being operationally connected to said digital video capture device, said memory system and said digital video capture device being connected to move in combination relative to a surrounding environment;

monitoring acceleration of said memory system relative to said surrounding environment; and adjusting said compression of said digital video stream to a second compression ratio in response to said detecting a preselected condition related to acceleration of said memory system; said compression adjusting including:

(1) temporarily suspending writing operations by said memory system in response to detecting that an acceleration threshold has been exceeded;

(2) measuring an amount of time that writing to said memory system is temporarily suspended because said acceleration threshold has been exceeded; and (3) setting said second compression ratio at a value that is based upon said measured amount of time.

2. The method of claim 1 further comprising a step of establishing said acceleration threshold that is selected based upon a capability of said memory system to accurately write said compressed digital video stream when subjected to an acceleration beyond said acceleration threshold.

3. The method of claim 2 wherein said step of adjusting includes a step of increasing said digital video compression to said second compression ratio when said acceleration threshold is exceeded, said second compression ratio being greater than said first compression ratio.

4. The method of claim 1 wherein said step of adjusting further includes steps of:

monitoring available storage capacity in a write buffer that receives said compressed digital video stream before said compressed digital video stream is written to said memory system; and increasing said second compression ratio as said available storage capacity in said write buffer decreases.

5. The method of claim 4 wherein said step of generating said digital video stream includes a step of formatting said digital video stream according to a Motion Picture Expert Group (MPEG) standard.

6. The method of claim 4 wherein said step of monitoring acceleration includes a step of receiving acceleration measurements from an accelerometer that is structurally connected to said memory system.

7. The method of claim 4 wherein said step of monitoring acceleration includes a step of determining acceleration through a comparison analysis of motion vectors that are calculated from pixel data comparisons, where pixel data for said comparisons is acquired from said digital video stream.

8. The method of claim 4 wherein said step of adjusting said compression includes a step of identifying periodic acceleration patterns from said monitored acceleration.

9. The method of claim 2 wherein said memory system is an optical memory system that writes digital video data to an optical disk.

10. An apparatus for capturing digital video streams comprising:

a digital video capture device that generates a digital video stream;

means, operatively associated with said digital video capture device, for compressing said digital video stream that is generated by said digital video capture device into a compressed digital video stream having a compression ratio that is measured on a data volume basis;

means, operatively associated with said means for compressing, for recording said compressed digital video stream;

means, operatively associated with said means for recording, for monitoring an anticipated capability of said means for recording to record said compressed digital video stream based upon detecting acceleration of said means for recording, said means for monitoring being configured to detect patterns of periodic accelerations, said means for monitoring including an acceleration detection unit having an output that is indicative of motion of said means for recording and indicative of detections of said patterns of periodic accelerations; and means, operatively associated with said means for monitoring said anticipated capability and said means for compressing, for adjusting said compression ratio of said digital video stream in response to detected acceleration that exceeds an identified acceleration threshold, said means for adjusting further being responsive to said detections of said patterns of periodic accelerations when determining said compression ratio, said acceleration threshold being based upon perceived operational parameters of said means for recording.

11. The apparatus of claim 10 wherein said means for recording comprises an optical recording system.

12. The apparatus of claim 11 wherein said optical recording system writes said compressed digital video stream onto an optical disk.

13. The apparatus of claim 11 wherein said identified acceleration threshold relates to a change of acceleration beyond which said optical recording system is perceived as being incapable of accurately recording said compressed digital video stream.

14. The apparatus of claim 13 wherein said acceleration detection unit comprises an accelerometer that is physically connected to said optical recording system, wherein said accelerometer has an output for signaling to said means for adjusting when said identified acceleration threshold has been exceeded.

15. The apparatus of claim 13 wherein said acceleration detection unit is operationally associated with said video capture device and includes circuitry that calculates acceleration of said optical recording system through analysis of differential changes in pixel values of said generated digital video stream.

16. The apparatus of claim 13 further including a write buffer connected between said means for compressing and said means for recording, said write buffer having an output for indicating to said means for adjusting an available storage capacity of said write buffer.

17. A method for capturing digital video streams with a mobile video capture system comprising the steps of:

generating a stream of digital video data;

compressing said stream of digital video data before said stream of digital video data is forwarded to an optical memory system;

monitoring acceleration that is experienced by said optical memory system, including detecting patterns of periodic accelerations;

outputting an indicator of said acceleration that is experienced by said optical memory system;

selectively adjusting said compression of said stream of digital video data in response to said indicator of said acceleration that is experienced by said optical memory system, wherein said adjusting of said compression is responsive to detecting said patterns; and selectively suspending writing of said stream of digital video data onto said optical memory system in response to said indicator of said acceleration that is experienced by said optical memory system.

18. The method of claim 17 wherein said step of selectively adjusting includes steps of:

establishing an acceleration threshold;

comparing said indicator of said acceleration to said acceleration threshold; and increasing said compression of said stream of digital video data when said indicator of said acceleration exceeds said acceleration threshold.

19. The method of claim 18 further including steps of:

monitoring storage capacity of a write buffer that temporarily stores said compressed stream of digital video data before said compressed stream of digital video data is forwarded to said optical memory system;

outputting an indicator of said storage capacity of said write buffer; and adjusting said compression of said digital video data in response to said indicator of said storage capacity of said write buffer.

* * * * *